(12) United States Patent
Fay, II

(10) Patent No.: US 11,383,764 B2
(45) Date of Patent: Jul. 12, 2022

(54) METHOD AND CONTROL SYSTEM FOR LIMITING VEHICLE TURNING RADIUS

(71) Applicant: CNH Industrial America LLC, New Holland, PA (US)

(72) Inventor: Jeffrey Brown Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 225 days.

(21) Appl. No.: 16/680,890

(22) Filed: Nov. 12, 2019

(65) Prior Publication Data

US 2021/0139074 A1 May 13, 2021

(51) Int. Cl.
| | |
|---|---|
| *B62D 6/00* | (2006.01) |
| *A01B 69/04* | (2006.01) |
| *B60K 7/00* | (2006.01) |
| *B62D 11/04* | (2006.01) |
| *B62D 15/02* | (2006.01) |
| *B60B 33/00* | (2006.01) |

(52) U.S. Cl.
CPC ............ *B62D 6/002* (2013.01); *A01B 69/008* (2013.01); *B60K 7/0015* (2013.01); *B62D 11/04* (2013.01); *B62D 15/029* (2013.01); *B60B 33/00* (2013.01); *B60K 2007/0092* (2013.01)

(58) Field of Classification Search
CPC ...... B62D 6/002; B62D 11/04; B62D 15/029; B62D 15/025; B62D 13/00; B62D 9/002; A01B 69/008; A01B 59/041; A01B 69/004; B60K 7/0015; B60Y 2200/221
See application file for complete search history.

(56) References Cited

U.S. PATENT DOCUMENTS

| | | | |
|---|---|---|---|
| 2,833,196 A | 5/1958 | Bopf | |
| 8,087,225 B2 | 1/2012 | Salley et al. | |
| 9,016,711 B1 | 4/2015 | Mathews et al. | |
| 9,290,204 B2 | 3/2016 | Lavoie | |
| 9,296,421 B2 | 3/2016 | Lavoie | |
| 2005/0209763 A1* | 9/2005 | Offerle ................. | B62D 15/027 701/83 |
| 2005/0236894 A1* | 10/2005 | Lu ......................... | B60W 10/20 303/139 |

(Continued)

FOREIGN PATENT DOCUMENTS

DE 102008004159 8/2009

*Primary Examiner* — Mussa A Shaawat
(74) *Attorney, Agent, or Firm* — Peter Zacharias; Patrick Sheldrake

(57) ABSTRACT

The turning radius of a differentially steered vehicle towing a trailer is controlled when turning so that its turning radius is greater than a minimum allowable turning radius. The turning radius may be autonomously adjusted using a controller to monitor the instantaneous rotational speed differential between the driven wheels and increase or decrease the relative speed between the wheels when the instantaneous rotational speed differential exceeds a threshold rotational speed differential, indicating a turn which is too tight. Alternately, the turning radius may be controlled by the vehicle's operator, who receives a signal from the controller indicating that the vehicle's turning radius is less than the minimum allowable. The operator may then take action to enlarge the turning radius using manual controls.

12 Claims, 4 Drawing Sheets

(56) References Cited

U.S. PATENT DOCUMENTS

| | | | |
|---|---|---|---|
| 2005/0236896 A1* | 10/2005 | Offerle | B60W 30/045 303/146 |
| 2007/0051540 A1* | 3/2007 | Lawson, Jr. | B62D 11/003 180/6.48 |
| 2020/0189538 A1* | 6/2020 | Ota | F16H 48/22 |
| 2020/0217405 A1* | 7/2020 | Dumas | B60K 17/34 |
| 2020/0282829 A1* | 9/2020 | Dumas | B60K 17/02 |
| 2021/0033183 A1* | 2/2021 | Dumas | B60K 23/0808 |

* cited by examiner

METHOD AND CONTROL SYSTEM FOR LIMITING VEHICLE TURNING RADIUS

FIELD OF THE INVENTION

This invention relates to differentially steered vehicles and control systems for effecting differential steering.

BACKGROUND

Certain self-propelled vehicles, in particular agricultural equipment such as tractors and harvesters, including combines, windrowers, balers and mowers, are advantageously differentially steered. This steering method, wherein wheels or tracks move at different speeds relatively to one another to effect vehicle turning, provides for impressive maneuverability, and even zero-radius turns for maximum field efficiency. However, when differentially steered vehicles tow a trailer, there are limits imposed on the turning radius to avoid contact between the vehicle and its trailer. Trailers may include transport trailers as well as towed mowers, windrowers and balers and other implements. In a tight turn the trailing castors may, for example, contact the tongue of the trailer, damaging both. It would be advantageous to provide a control system which would allow an operator of such vehicles to avoid turns which are too tight and thereby avoid damage to either or both the vehicle and its trailer.

SUMMARY

One aspect of the invention concerns a method of limiting a turning radius of a differentially steered vehicle when towing a trailer. The vehicle has a left wheel and a right wheel which are rotatable at different speeds from one another to effect turning of the vehicle. In one example embodiment the method comprises:
  measuring a rotational speed of the left wheel;
  measuring a rotational speed of the right wheel;
  comparing the rotational speed of the left wheel with the rotational speed of the right wheel to establish an instantaneous rotational speed differential between the left wheel and the right wheel;
  comparing the instantaneous rotational speed differential with a threshold rotational speed differential; wherein if the instantaneous rotational speed differential exceeds the threshold rotational speed differential:
  increasing the rotational speed of a slower rotating one of the left wheel and the right wheel; or
  decreasing the rotational speed of a faster rotating one of the left wheel and the right wheel; or
  increasing the rotational speed of the slower rotating one of the left wheel and the right wheel while decreasing the rotational speed of the faster rotating one of the left wheel and the right wheel.

An example method according to the invention may further comprise sensing that the trailer is coupled to the vehicle. Further by way of example, a method may comprise:
  comparing the instantaneous rotational speed differential with the threshold speed differential at a plurality of discrete time intervals; and
  increasing the rotational speed of the slower rotating one of the left wheel and the right wheel unless the instantaneous rotational speed differential is equal to or less than the threshold speed differential.

An example method may also comprise:
  comparing the instantaneous rotational speed differential with the threshold speed differential at a plurality of discrete time intervals; and
  decreasing the rotational speed of the faster rotating one of the left wheel and the right wheel unless the instantaneous rotational speed differential is equal to or less than the threshold speed differential.

Another example method may comprise:
  comparing the instantaneous rotational speed differential with the threshold speed differential at a plurality of discrete time intervals; and
  increasing the rotational speed of the slower rotating one of the left wheel and the right wheel while decreasing the rotational speed of the faster rotating one of the left wheel and the right wheel unless the instantaneous rotational speed differential is equal to or less than the threshold speed differential.

An example method may include establishing a threshold rotational speed differential based upon a parameter selected from the group consisting of a minimum allowable turning radius, a minimum allowable angle between a direction of motion of the vehicle and a direction of motion of the trailer, a minimum allowable angle between the vehicle and a tongue of the trailer, a wheel base of the vehicle, a wheel base of the trailer, a model of the vehicle, a model of the trailer, and combinations thereof.

The invention also encompasses a method of alerting an operator of a differentially steered vehicle towing a trailer while turning at a turning radius that the turning radius is less than a minimum allowable turning radius. The vehicle has a left wheel and a right wheel rotatable at different speeds from one another to effect turning of the vehicle. In one example embodiment the method comprises:
  measuring a rotational speed of the left wheel;
  measuring a rotational speed of the right wheel;
  comparing the rotational speed of the left wheel with the rotational speed of the right wheel to establish an instantaneous rotational speed differential between the left wheel and the right wheel;
  comparing the instantaneous rotational speed differential with a threshold rotational speed differential; wherein
  if the instantaneous rotational speed differential exceeds the threshold rotational speed differential, providing a signal to the operator that the turning radius is less than the minimum allowable turning radius.

An example method may further comprise sensing that the trailer is coupled to the vehicle. Further by way of example, a method may comprise:
  comparing the instantaneous rotational speed differential with the threshold speed differential at a plurality of discrete time intervals; and
  providing the signal to the operator throughout each time interval that the instantaneous rotational speed differential is greater than the threshold speed differential, or:
  comparing the instantaneous rotational speed differential with the threshold speed differential at a plurality of discrete time intervals; and
  providing the signal to the operator throughout each the time interval that the instantaneous rotational speed differential is equal to or greater than the threshold speed differential. By way of example the signal may be an audible signal, a visual signal, a tactile signal or combinations thereof.

An example method embodiment may further comprise establishing a threshold rotational speed differential based upon a parameter selected from the group consisting of a minimum allowable turning radius, a minimum allowable angle between a direction of motion of the vehicle and a direction of motion of the trailer, a minimum allowable angle between the vehicle and a tongue of the trailer, a wheel base of the vehicle, a wheel base of the trailer, a model of the vehicle, a model of the trailer, and combinations thereof.

The invention also encompasses a control system for steering a vehicle having at least a left wheel and a right wheel which are rotatable at different speeds from one another to effect turning of the vehicle. In one example embodiment the control system comprises:

a controller;

a left wheel rotational speed sensor in communication with the controller, the left wheel speed sensor for measuring a rotational speed of the left wheel and sending signals indicative of the rotational speed of the left wheel to the controller;

a right wheel rotational speed sensor in communication with the controller, the right wheel speed sensor for measuring a rotational speed of the right wheel and sending signals indicative of the rotational speed of the right wheel to the controller;

a left wheel actuator in communication with the controller for adjusting the rotational speed of the left wheel;

a right wheel actuator in communication with the controller for adjusting the rotational speed of the right wheel; wherein the controller is adapted to:

receive the signals indicative of the left and the right wheel rotational speeds;

compare the left and right wheel rotational speeds with one another to establish an instantaneous rotational speed differential between the left wheel and the right wheel; and adjust the rotational speeds of the left and right wheels using the left and right wheel actuators and reduce the instantaneous rotational speed differential to a value less than or equal to a threshold value pursuant to a control method executed by the controller.

An example control system according to the invention may further comprise a trailer sensor in communication with the controller. The trailer sensor is adapted to generate signals indicative of the trailer being coupled to the vehicle. The controller is adapted to receive the signals indicative of the trailer being coupled to the vehicle.

In an example embodiment of a control system according to the invention for use with the vehicle wherein torque is applied to the left wheel by a left hydraulic pump having a left swashplate, and torque is applied to the right wheel by a right hydraulic pump having a right swashplate, the left wheel actuator may comprise a left swashplate actuator in communication with the controller for adjusting a left swashplate angle of the left swashplate. Further by way of example the right wheel actuator may comprise a right swashplate actuator in communication with the controller for adjusting a right swashplate angle of the right swashplate. In the example control system embodiment the controller is adapted to adjust the left and right swashplate angles using the left and right swashplate actuators to reduce the instantaneous rotational speed differential to a value less than or equal to a threshold value pursuant to a control method executed by the controller.

The invention also includes a differentially steered vehicle. In an example embodiment the vehicle comprises a chassis having an engine and a plurality of wheels mounted thereon including a left wheel and a right wheel disposed on opposite sides of the vehicle. A left hydraulic motor is operatively associated with the left wheel and a right hydraulic motor is operatively associated with the right wheel. A left hydraulic pump is driven by the engine. The left hydraulic pump is operatively associated with the left hydraulic motor and has a left swashplate. A right hydraulic pump is driven by the engine. The right hydraulic pump is operatively associated with the right hydraulic motor and has a right swashplate. The example vehicle further comprises a controller. A left wheel rotational speed sensor is in communication with the controller. The left wheel speed sensor measures a rotational speed of the left wheel and sends signals indicative of the rotational speed of the left wheel to the controller. A right wheel rotational speed sensor is in communication with the controller. The right wheel speed sensor measures a rotational speed of the right wheel and sends signals indicative of the rotational speed of the right wheel to the controller. A left swashplate actuator is in communication with the controller for adjusting a left swashplate angle of the left swashplate. A right swashplate actuator is in communication with the controller for adjusting a right swashplate angle of the right swashplate. In an example embodiment the controller is adapted to:

receive the signals indicative of the left and the right wheel rotational speeds;

compare the left and right wheel rotational speeds with one another to establish an instantaneous rotational speed differential between the left wheel and the right wheel; and adjust the rotational speeds of the left and right wheels using the left and right wheel actuators and reduce the instantaneous rotational speed differential to a value less than or equal to a threshold value pursuant to a control method executed by the controller.

By way of example the vehicle may comprise a tractor or a harvester.

The invention also includes a differentially steered vehicle. In an example embodiment the vehicle comprises a chassis having an engine and a plurality of wheels mounted thereon including a left wheel and a right wheel disposed on opposite sides of the vehicle. A left hydraulic motor is operatively associated with the left wheel and a right hydraulic motor is operatively associated with the right wheel. A left hydraulic pump is driven by the engine. The left hydraulic pump is operatively associated with the left hydraulic motor and has a left swashplate. A right hydraulic pump is driven by the engine. The right hydraulic pump is operatively associated with the right hydraulic motor and has a right swashplate. The example vehicle further comprises a controller. A left wheel rotational speed sensor is in communication with the controller. The left wheel speed sensor measures a rotational speed of the left wheel and sends signals indicative of the rotational speed of the left wheel to the controller. A right wheel rotational speed sensor is in communication with the controller. The right wheel speed sensor measures a rotational speed of the right wheel and sends signals indicative of the rotational speed of the right wheel to the controller. A left swashplate actuator is in communication with the controller for adjusting a left swashplate angle of the left swashplate. A right swashplate actuator is in communication with the controller for adjusting a right swashplate angle of the right swashplate. A signal device is mounted on the vehicle for signaling an operator of the vehicle. By way of example, the controller is adapted to:

receive the signals indicative of the left and the right wheel rotational speeds;

compare the left and right wheel rotational speeds with one another to establish an instantaneous rotational speed differential between the left wheel and the right wheel; and compare the instantaneous rotational speed differential with a threshold rotational speed differential; wherein if the instantaneous rotational speed differential exceeds the threshold rotational speed differential, provide a signal to the operator that the vehicle is turning at a turning radius less than a minimum allowable turning radius.

By way of example the vehicle may comprise a tractor or a harvester. Further by way of example, the signal device is selected from the group consisting of audible alarm devices, visual alarm devices, tactile alarm devices and combinations thereof.

DETAILED DESCRIPTION

Figure 1:
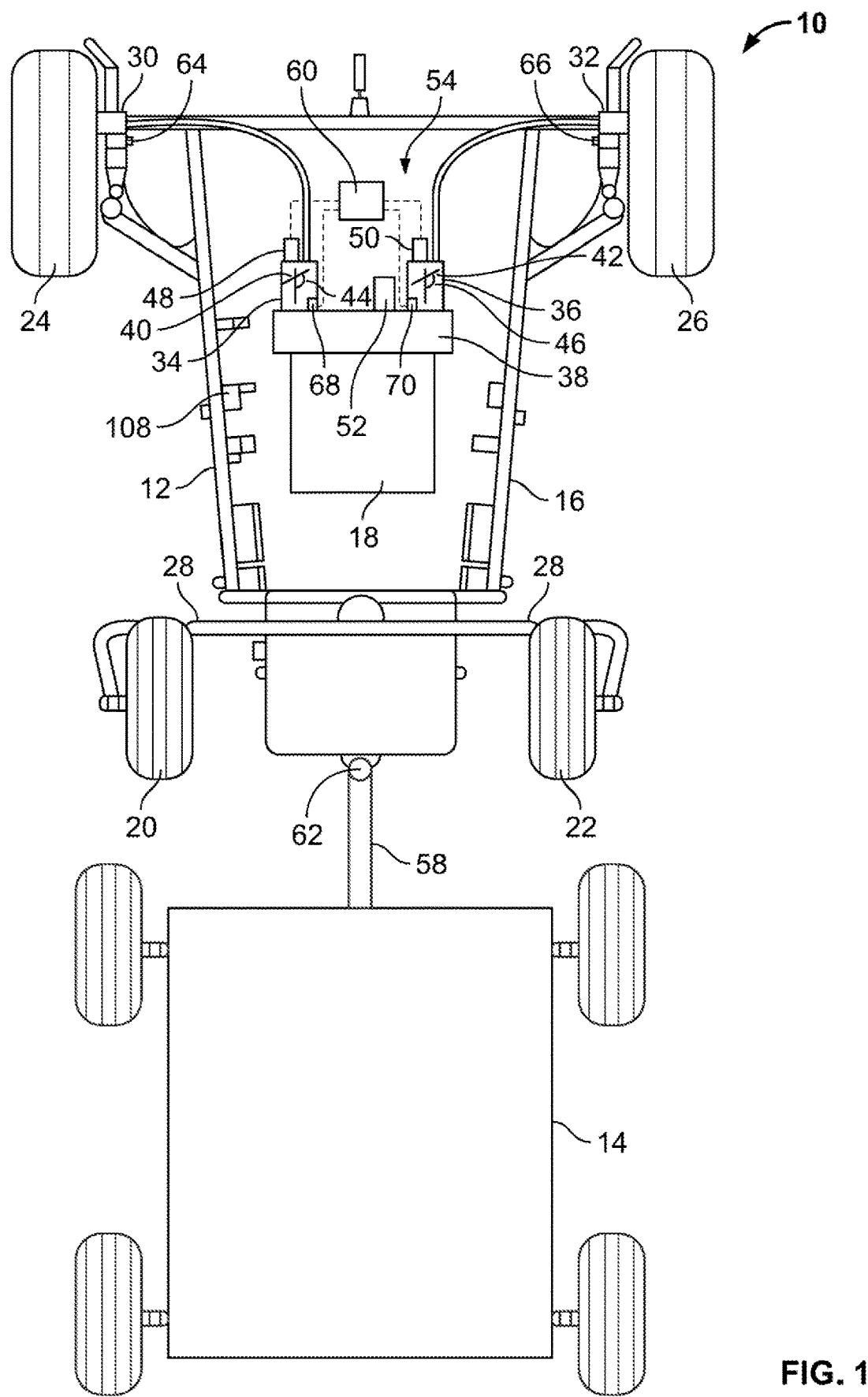
FIG. 1 is a plan view of an example vehicle according to the invention towing a trailer.

FIG. 1 shows an example differentially steered vehicle 10 according to the invention. Vehicle 10 in this example comprises a tractor 12 towing a transport trailer 14. It is understood that the invention encompasses other types of differentially steered vehicles (tracked as well as wheeled vehicles such as harvesters including self-propelled combines, windrowers, mowers and balers) capable of towing any type of trailer including towed wind rowers, mowers, balers and combines. Vehicle 10 comprises a chassis 16 on which an engine 18 is mounted. A plurality of wheels, in this example 4 wheels 20, 22, 24 and 26, are also mounted on chassis 16. Wheels 20 and 22 are free wheeling and caster about respective caster axes 28 to follow vehicle 10 as it turns. Wheels 24 (left wheel) and 26 (right wheel) are driven and have angularly fixed axles, steering being effected by applying different torque to one wheel than the other thereby causing the wheel with the greater applied torque to rotate faster than the wheel having less applied torque, the turn being in the direction of the slower rotating wheel.

Torque is applied to the left wheel 24 by a left hydraulic motor 30 operatively associated with the left wheel, and torque is applied to the right wheel 26 by a right hydraulic motor 32 operatively associated with the right wheel, both motors mounted on the chassis 16. The left hydraulic motor 30 is driven by a left hydraulic pump 34 operatively associated with the left hydraulic motor and the right hydraulic motor 32 is driven by a right hydraulic pump 36 operatively associate with the right hydraulic motor. Both hydraulic pumps 34 and 36 are driven by engine 18 through a gear box 38 and may comprise axial piston pumps as in this example.

As is well understood, the output (pressure, volume rate of flow) from an axial piston pump is controlled by adjusting the angle of the pump's swashplate with respect to the pump shaft's axis of rotation. Larger swashplate angles produce greater pump output. Vehicle 10 comprises a left swashplate 40 in the left hydraulic pump 34 and a right swashplate 42 in the right hydraulic pump 36. The left swashplate 40 is adjustable through a left swashplate angle 44 and the right swashplate 42 is adjustable through a right swashplate angle 46. In this example embodiment the left swashplate angle 44 is adjusted by a left swashplate actuator 48 and the right swashplate angle 46 is adjusted by a right swashplate actuator 50. Actuators 48 and 50 may be hydraulic actuators as in this example, driven by an actuator pump 52 by engine 18 through gear box 38.

Vehicle 10 is steered differentially by adjusting the left and right swashplate angles 44 and 46 of the left and right hydraulic pumps 34 and 36. When the left and right swashplate angles are equal and both pumps 34 and 36 are driven at the same speed, equal torque will be applied to the left and right wheels 24 and 26 via their respective left and right hydraulic motors 30 and 32. The left and right wheels 24 and 26 have the same rotational speed about their axes of rotation and the vehicle 10 will move along a straight line. The speed of vehicle 10 is proportional to the swashplate angle, with greater swashplate angles producing higher speeds. To turn to the left, the swashplate angles 44 and 46 are adjusted with respect to one another so that the right swashplate angle 46 is greater than the left swashplate angle 44. More hydraulic oil flows to the right hydraulic motor 32 and thus more torque is applied to the right wheel 26 which causes the right wheel 26 to rotate faster than the left wheel 24 and vehicle 10 consequently turns to the left. To turn to the right, the swashplate angles are adjusted with respect to one another so that the left swashplate angle 44 is greater than the right swashplate angle 46. More hydraulic oil flows to the left hydraulic motor 30 and thus more torque is applied to the left wheel 24 which causes the left wheel 24 to rotate faster than the right wheel 26 and consequently vehicle 10 turns to the right. The turning radius of the vehicle is proportional to the difference between the rotational speed of the left and right wheels, known as the instantaneous rotational speed differential.

Figure 2:
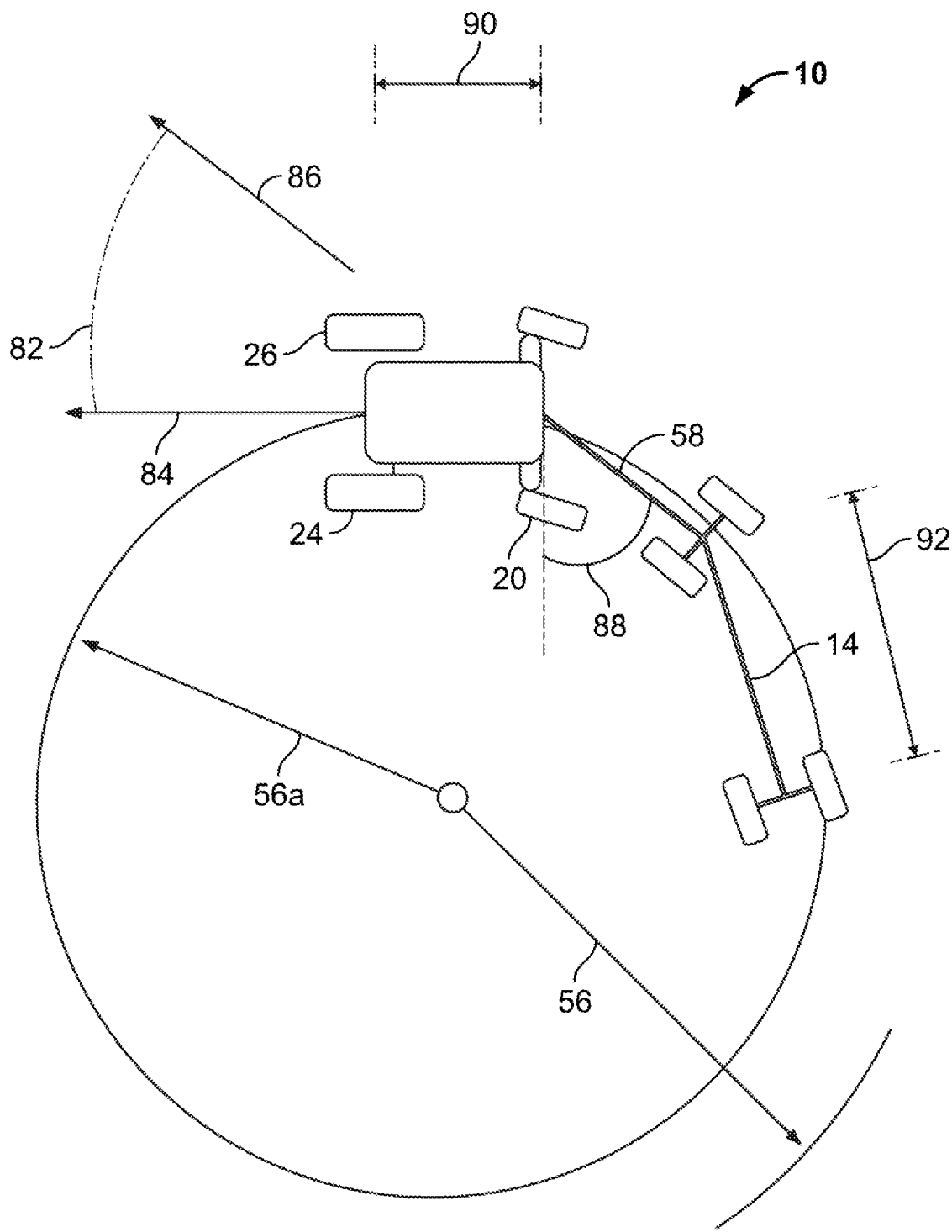
FIG. 2 is a plan view of an example vehicle according to the invention towing a trailer in a turn.

Vehicle 10 further comprises a control system 54. Control system 54 permits differential steering of vehicle 10 according to a method which, as shown in FIG. 2, limits the vehicle's turning radius 56 to ensure it is greater than or equal to a minimum allowable turning radius 56a. The method, examples of which are described below, is advantageously invoked when vehicle 10 is towing trailer 14. Differentially steered vehicles 10 are capable of very tight turns, even down to zero-radius turns when wheels 24 and 26 are rotated in opposite directions. While this capability provides superior maneuverability for maximum field efficiency, it can have adverse effects when a trailer is towed. Tight turns can result in contact between the vehicle 10 and trailer 14, for example, between caster wheel 20 and the tongue 58 of trailer 14 in FIG. 2. To avoid such contact, and the potential damage to both vehicle and trailer, it is advantageous to employ an example control system and steering method according to the invention.

As shown in FIG. 1, control system 54 comprises a controller 60, for example a programmable logic controller or other microprocessor based computer mounted on chassis 16. Resident software on the controller provides algorithms to execute the differential method of steering according to the invention. The controller 60 may be in communication with a trailer sensor 62 which detects the presence of trailer 14 coupled to vehicle 10. Trailer sensor 62 generates signals indicative of the trailer coupled to the vehicle which it transmits to the controller 60. Communication between the controller 60 and the trailer sensor 62 may be via wires or wirelessly via radio frequency transmitters. Example trailer sensors include a micro switch which closes when a tow hitch on vehicle 10 is deployed or the tongue 58 is coupled to the hitch, or a trailer lighting harness which closes a circuit to the controller when it is connected to the vehicle electrical system. Controller 60 is adapted to receive signals from the trailer sensor 62 and invoke the method of differential steering according to the invention Control system 54 further comprises a left wheel rotational speed sensor 64 and a right wheel rotational speed sensor 66. These sensors are operatively associated with respective wheels 24 and 26 and measure the respective rotational speeds of each wheel. Rotational speed sensors 64 and 66 also generate signals indicative of the rotational speed of wheels 24 and 26 and transmit the signals to controller 60. Transmission of the signals may be via wire or wirelessly via radio frequency transmitters. Controller 60 is adapted to receive the signals from the rotational speed sensors 64 and 66 and compare the left and right wheel rotational speeds to establish the instantaneous rotational speed differential between them. The turning radius 56 of vehicle 10 (see FIG. 2) will be a function of the instantaneous rotational speed differential, with a larger rotational speed differential corresponding to a tighter turn and a smaller turning radius.

As further shown in FIG. 1, control system 54 also comprises a left wheel actuator 68 and a right wheel actuator 70. Actuators 68 and 70 are in communication with controller 60, which is adapted to transmit command signals to the actuators allowing the controller to adjust (increase or decrease) the rotational speeds of the left and right wheels 24 and 26 and thereby determine the turning radius 56 of vehicle 10 (see also FIG. 2). In this example embodiment the left wheel actuator 68 comprises the left swashplate actuator 48 and the right wheel actuator 70 comprises the right swashplate actuator 50. The swashplate actuators 48 and 50 respectively control the swashplate angles 44 and 46 and thus control the respective rotational speeds of the right and left wheels 24 and 26. The controller 60 is adapted to adjust the left and right swashplate angles 44 and 46 via the actuators and thereby adjust the instantaneous rotational speed differential, for example, to reduce it to a value less than or equal to a threshold value which corresponds to a desired turning radius greater than the minimum allowable turning radius 56a of the vehicle 10.

Figure 3:
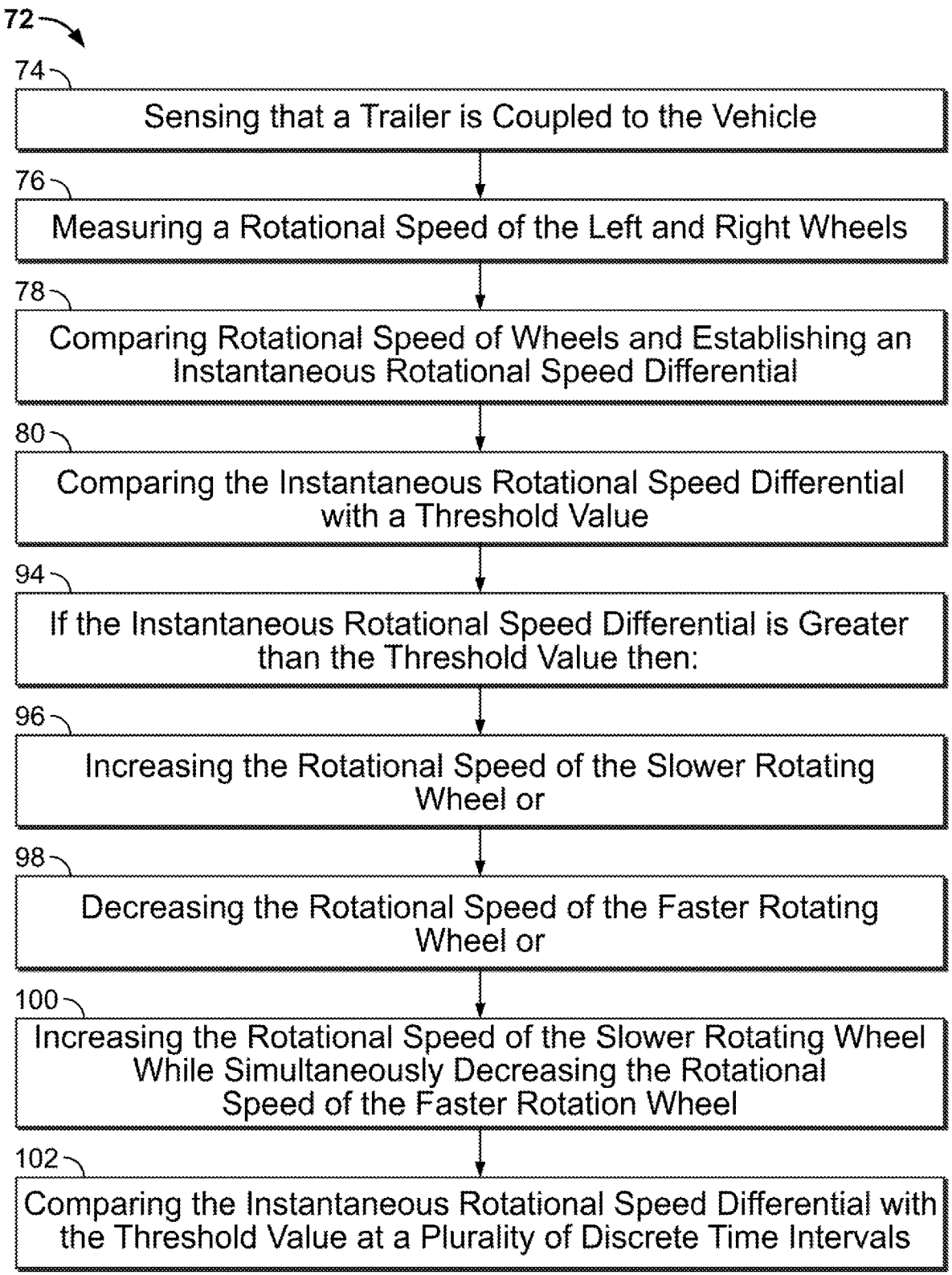
FIGS. 3 and 4 are flow charts illustrating example methods of differentially steering a vehicle while towing a trailer according to the invention.

An example steering control method which limits a turning radius of a differentially steered vehicle 10 when towing a trailer 14 is illustrated in FIGS. 2 and 3. As shown in the flow chart of FIG. 3, the example method 72 may include sensing that trailer 14 is coupled to vehicle 10 (74). This step is conveniently executed using the trailer sensor 62. When controller 60 receives a signal from the trailer sensor 62 the controller invokes the steering method 72, the method otherwise not being needed or desired in the absence of towed trailer. The controller next measures the rotational speed of the left and right wheels 24 and 26 (76) using respective left and right wheel speed sensors 64 and 66 and compares these rotational speeds to one another to establish the instantaneous rotational speed differential between the left and right wheels 24 and 26 (78). Controller 60 next compares the instantaneous rotational speed differential with a threshold rotational speed differential (80). This threshold rotational speed differential corresponds to a minimum allowable turning radius 56a (see FIG. 2). The threshold rotational speed differential will be different for different vehicles and trailers and may be established based upon one or more parameters such as an experimentally determined minimum allowable turning radius 56a, a maximum allowable angle 82 between a direction of motion 84 of the vehicle 10 and a direction of motion 86 of the trailer 14, a minimum allowable angle 88 between the vehicle 10 and the tongue 58 of the trailer 14, a wheel base 90 of the vehicle 10, a wheel base 92 of the trailer 14, the type (model) of the vehicle 10, the type (model) of the trailer 14, and combinations of these parameters.

If the instantaneous rotational speed differential established by the controller is greater than the threshold rotational speed differential (94) then the vehicle 10 is in danger of turning tighter than permitted while towing trailer 14 and the controller may act in at least one of three ways: 1) by increasing the rotational speed of the slower rotating wheel (96); 2) decreasing the rotational speed of the faster rotating wheel (98); or 3) increasing the rotational speed of the slower rotating wheel while simultaneously decreasing the rotational speed of the faster rotating wheel (100). Once a turning radius larger than or equal to the minimum allowable turning radius 56a is established (as indicated by the instantaneous rotational speed differential being equal to or less than the threshold rotational speed differential) the controller ceases changing the rotational speed of the wheels. It is further advantageous for controller 60 to compare the instantaneous rotational speed differential with the threshold speed differential at a plurality of discrete time intervals (102) and thereby constantly monitor the turning radius of the vehicle 10 and take appropriate action as the instantaneous rotational speed differential changes over time while the vehicle is moving.

Figure 4:
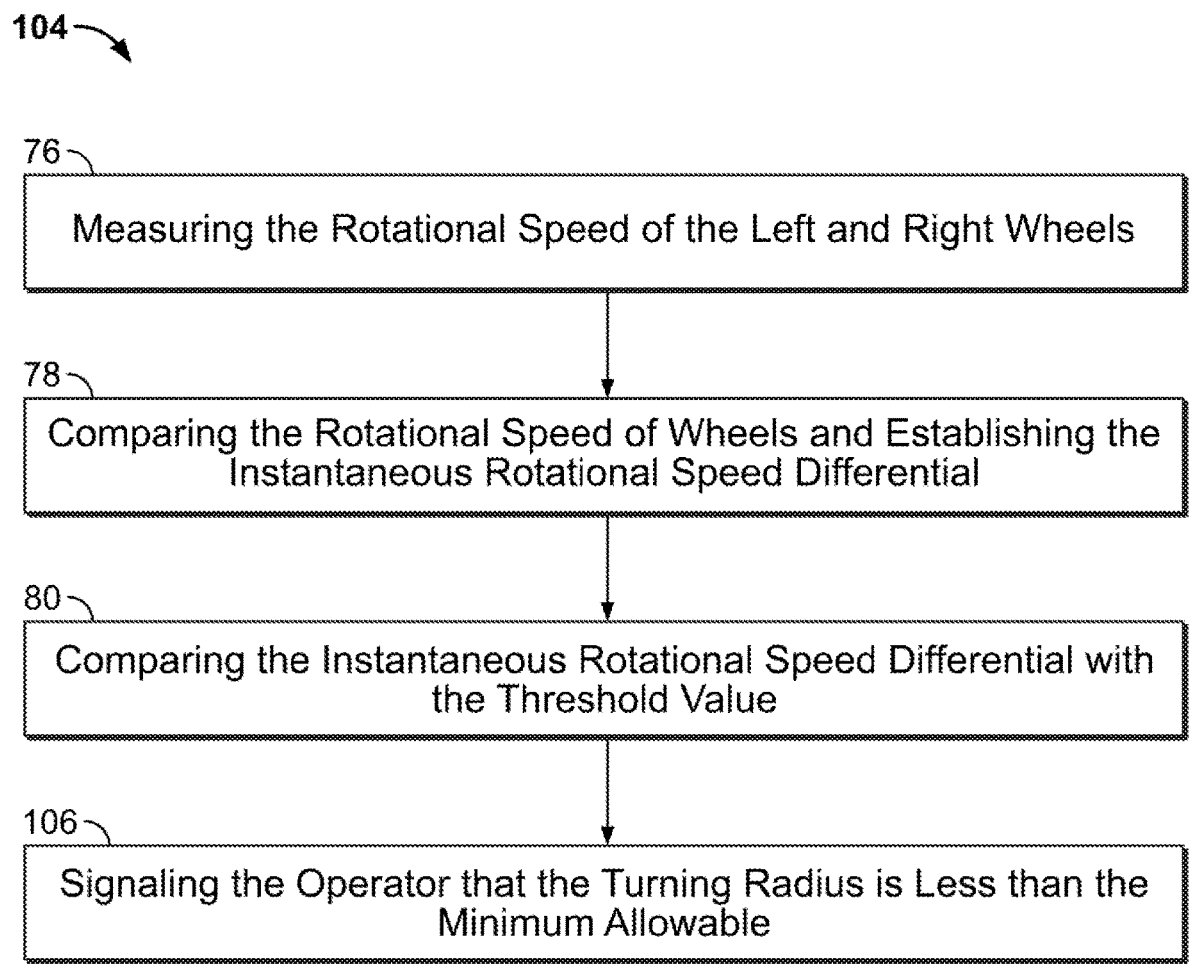

FIG. 4 illustrates another embodiment of a method 104 for limiting the turning radius of a vehicle 10. However, instead of having the controller 60 directly adjust the rotational speed of the wheels 24 and 26, the method 104 alerts an operator of the vehicle that the vehicle is turning at a turning radius which is less than the minimum allowable turning radius 56a. Method 104 measures the rotational speeds of the left and right wheels (76), establishes the instantaneous rotational speed differential (78), compares the instantaneous rotational speed differential with the threshold rotational speed differential (80) and then if the instantaneous rotational speed differential exceeds the threshold rotational speed differential the controller provides a signal to the operator indicating that the instantaneous turning radius is less than the minimum allowed turning radius 56a (106). The signal may be an audible signal, a visual signal, a tactile signal, or any combination of such signals. To accommodate method 104 the controller 60 is adapted to communicate with one or more alarm devices 108 mounted on vehicle 10, preferably within its control cab (not shown). The alarm devices 108 may produce audible signals, such as a horn or siren, a visual signal, for example on a display screen, or a tactile signal, such as a vibration transmitted to the operator through a seat or a control device such as a steering wheel.

It is expected that vehicles, such as tractors and harvesters including self-propelled windrowers, mowers, balers and combines, which tow trailers such as transport trailers, mowers, and windrowers, will be able to better avoid damage to both the vehicle and the trailer while turning when methods and vehicles according to the invention are implemented.

What is claimed is:

1. A method of limiting a turning radius of a differentially steered vehicle when towing a trailer, said vehicle having a left wheel and a right wheel being rotatable at different speeds from one another to effect turning of said vehicle, said method comprising:
  measuring a rotational speed of said left wheel;
  measuring a rotational speed of said right wheel;
  comparing said rotational speed of said left wheel with said rotational speed of said right wheel to establish an instantaneous rotational speed differential between said left wheel and said right wheel; and
  comparing said instantaneous rotational speed differential with a threshold rotational speed differential, the threshold rotational speed differential being set by a minimum allowable turning radius of the vehicle when the vehicle is towing the trailer, the threshold rotational speed differential ensuring that the turning radius of the vehicle is greater than or equal to the minimum allowable turning radius, wherein if said instantaneous rotational speed differential exceeds said threshold rotational speed differential:
increasing said rotational speed of a slower rotating one of said left wheel and said right wheel; or
decreasing said rotational speed of a faster rotating one of said left wheel and said right wheel; or
increasing said rotational speed of said slower rotating one of said left wheel and said right wheel while decreasing said rotational speed of said faster rotating one of said left wheel and said right wheel.

2. The method according to claim 1, further comprising sensing that said trailer is coupled to said vehicle, the sensing step invoking the method.

3. The method according to claim 1, further comprising:
comparing said instantaneous rotational speed differential with said threshold speed differential at a plurality of discrete time intervals; and
increasing said rotational speed of said slower rotating one of said left wheel and said right wheel unless said instantaneous rotational speed differential is equal to or less than said threshold speed differential.

4. The method according to claim 1, further comprising:
comparing said instantaneous rotational speed differential with said threshold speed differential at a plurality of discrete time intervals; and
decreasing said rotational speed of said faster rotating one of said left wheel and said right wheel unless said instantaneous rotational speed differential is equal to or less than said threshold speed differential.

5. The method according to claim 1, further comprising:
comparing said instantaneous rotational speed differential with said threshold speed differential at a plurality of discrete time intervals; and
increasing said rotational speed of said slower rotating one of said left wheel and said right wheel while decreasing said rotational speed of said faster rotating one of said left wheel and said right wheel unless said instantaneous rotational speed differential is equal to or less than said threshold speed differential.

6. The method according to claim 1, further comprising establishing a threshold rotational speed differential based upon a parameter selected from the group consisting of a minimum allowable turning radius, a minimum allowable angle between a direction of motion of said vehicle and a direction of motion of said trailer, a minimum allowable angle between said vehicle and a tongue of said trailer, a wheel base of said vehicle, a wheel base of said trailer, a model of said vehicle, a model of said trailer, and combinations thereof.

7. A control system for steering a vehicle having at least a left wheel and a right wheel being rotatable at different speeds from one another to effect turning of said vehicle, said control system comprising:
a controller;
a left wheel rotational speed sensor in communication with said controller, said left wheel speed sensor for measuring a rotational speed of said left wheel and sending signals indicative of said rotational speed of said left wheel to said controller;
a right wheel rotational speed sensor in communication with said controller, said right wheel speed sensor for measuring a rotational speed of said right wheel and sending signals indicative of said rotational speed of said right wheel to said controller;
a left wheel actuator in communication with said controller for adjusting said rotational speed of said left wheel; and
a right wheel actuator in communication with said controller for adjusting said rotational speed of said right wheel; wherein said controller is adapted to:
receive said signals indicative of said left and said right wheel rotational speeds;
compare said left and right wheel rotational speeds with one another to establish an instantaneous rotational speed differential between said left wheel and said right wheel; and
adjust said rotational speeds of said left and right wheels using said left and right wheel actuators and reduce said instantaneous rotational speed differential to a value less than or equal to a threshold value pursuant to a control method executed by said controller, the threshold value being set by a minimum allowable turning radius of the vehicle, the threshold value ensuring that the turning radius of the vehicle is greater than or equal to the minimum allowable turning radius.

8. The control system according to claim 7, further comprising a trailer sensor in communication with said controller, said trailer sensor adapted to generate signals indicative of said trailer being coupled to said vehicle, said controller being adapted to receive said signals indicative of said trailer being coupled to said vehicle.

9. The control system according to claim 7 for use with said vehicle wherein torque is applied to said left wheel by a left hydraulic pump having a left swashplate, torque is applied to said right wheel by a right hydraulic pump having a right swashplate, wherein:
said left wheel actuator comprises a left swashplate actuator in communication with said controller for adjusting a left swashplate angle of said left swashplate; and
said right wheel actuator comprises a right swashplate actuator in communication with said controller for adjusting a right swashplate angle of said right swashplate, wherein said controller is adapted to adjust said left and right swashplate angles using said left and right swashplate actuators to reduce said instantaneous rotational speed differential to a value less than or equal to the threshold value pursuant to a control method executed by said controller.

10. A differentially steered vehicle, said vehicle comprising:
a chassis having an engine and a plurality of wheels mounted thereon including a left wheel and a right wheel disposed on opposite sides of said vehicle;
a left hydraulic motor operatively associated with said left wheel;
a right hydraulic motor operatively associated with said right wheel;
a left hydraulic pump driven by said engine, said left hydraulic pump operatively associated with said left hydraulic motor and having a left swashplate;
a right hydraulic pump driven by said engine, said right hydraulic pump operatively associated with said right hydraulic motor and having a right swashplate;

a controller;

a left wheel rotational speed sensor in communication with said controller, said left wheel speed sensor for measuring a rotational speed of said left wheel and sending signals indicative of said rotational speed of said left wheel to said controller;

a right wheel rotational speed sensor in communication with said controller, said right wheel speed sensor for measuring a rotational speed of said right wheel and sending signals indicative of said rotational speed of said right wheel to said controller;

a left swashplate actuator in communication with said controller for adjusting a left swashplate angle of said left swashplate; and a right swashplate actuator in communication with said controller for adjusting a right swashplate angle of said right swashplate; wherein said controller is adapted to:

receive said signals indicative of said left and said right wheel rotational speeds;

compare said left and right wheel rotational speeds with one another to establish an instantaneous rotational speed differential between said left wheel and said right wheel; and adjust said rotational speeds of said left and right wheels using said left and right wheel actuators and reduce said instantaneous rotational speed differential to a value less than or equal to a threshold value pursuant to a control method executed by said controller, the threshold value being set by a minimum allowable turning radius of the vehicle, the threshold value ensuring that the turning radius of the vehicle is greater than or equal to the minimum allowable turning radius.

11. The vehicle according to claim 10, wherein said vehicle comprises a tractor.

12. The vehicle according to claim 10, wherein said vehicle comprises a harvester.

* * * * *